Nov. 11, 1930.   R. BURGMANN   1,781,365
PACKING OR TIGHTENING PLATE
Filed Oct. 23, 1928

Inventor:
Robert Burgmann

Patented Nov. 11, 1930

1,781,365

UNITED STATES PATENT OFFICE

ROBERT BURGMANN, OF DRESDEN, GERMANY

PACKING OR TIGHTENING PLATE

Application filed October 23, 1928, Serial No. 314,522, and in Germany April 12, 1928.

My invention relates to packing or tightening plates intended especially for the covers of the cylinder heads of internal combustion engines. Such plates have openings, of which some are intended for the passage of the cooling water which the engine requires, and others for the passage of the combustion gases. The duty devolved upon the plate is, therefore, to tighten reliably with respect to water (also oil), as well as to the combustion gases.

The plates of this kind which have become known up to now are not able to fulfil this purpose in a satisfying manner. In so far as they consist solely of asbestos-board or a similar substance, they tighten, it is true, sufficiently as regards water and oil, but not as regards combustion gases which are subjected to a very high pressure. On the other hand, the known copper-asbestos plate, which has a sheet-copper lining on one or on both surfaces of the asbestos plate renders possible, it is true, sufficient tightening with respect to the combustion gases, but not with respect to water and oil.

With the asbestos plates covered with sheet-copper on all sides the sheet-copper is flanged over the rims of the gas passage openings, or is folded into a specially provided metal ring lining said rims. The resistibility of the plate and its tightening capacity with respect to combustion gases can thereby be increased, but the lack of a good tightening with respect to water and oil cannot be overcome.

According to the present invention, a packing plate tightening reliably with respect to water and oil, as well as to combustion gases, is attained by the rims of the gas passage openings of a plate consisting of asbestos or the like in the above-described known manner being provided with a metal lining consisting preferably of sheet-nickel, the other parts of the plate being, however, left free from any metal covering whatever. At the same time, the manufacture of the plate is, in comparison with the known copper-asbestos plates, rendered cheaper.

Figure 1:
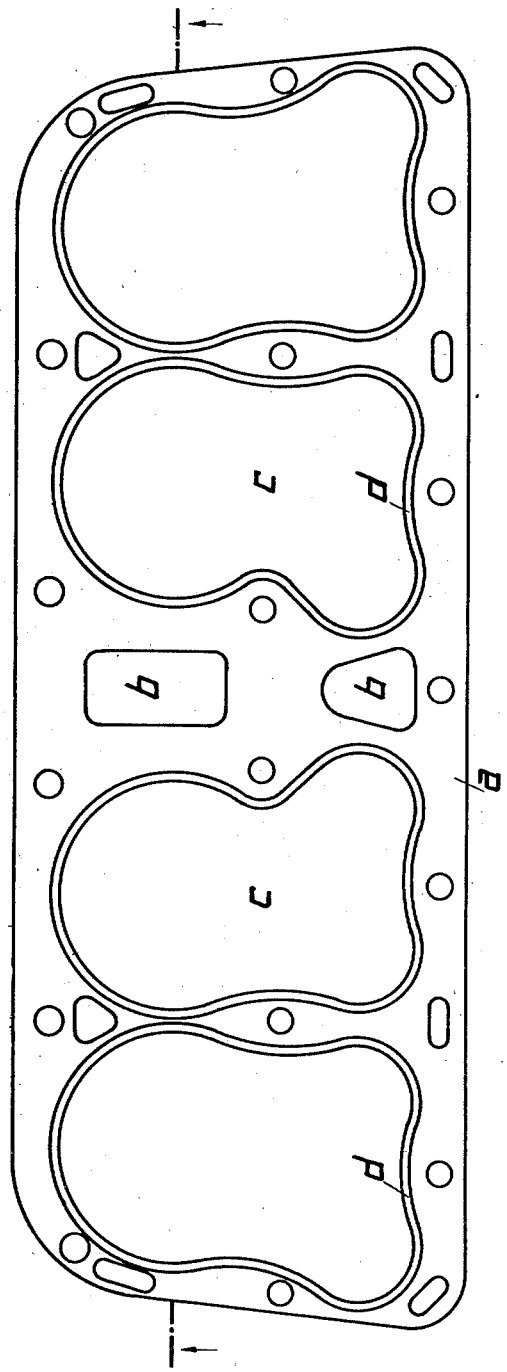
Figure 2:

The invention is illustrated diagrammatically and by way of example on the accompanying drawing, in which Figure 1 is a plan of a packing or tightening plate designed according to this invention, and Figure 2 a longitudinal section through the same.

The tightening plate consists, accordingly, of an asbestos plate provided with water passage openings $b$ and gas passage openings $c$. The rims $d$ of the latter are flanged with sheet-nickel, sheet-copper or the like, which at the same time is pressed so far into the plate that a completely plane plate surface is attained.

I claim:

For use in internal combustion engines having gas and water passages wherein it is desirable to have the gas passages sealed against high pressures and the water passages sealed against leakage, a gasket comprising an asbestos plate having both gas and water passages therein, and metallic flange members lining the rims of the gas passages in said plate to resist gas pressure, the water passages of said plate being free from any lining member to provide a packed joint.

In testimony whereof I affix my signature.

ROBERT BURGMANN.